United States Patent
Yamada et al.

(10) Patent No.: US 7,351,944 B2
(45) Date of Patent: Apr. 1, 2008

(54) BEAM IRRADIATION DEVICE

(75) Inventors: Masato Yamada, Inuyama (JP); Hitoshi Terasaki, Gifu (JP); Yoichi Tsuchiya, Hashima (JP); Shuichi Ichiura, Hashima (JP); Masahiro Higuchi, Gifu (JP); Mikio Ichihashi, Hashima (JP); Youichiro Goto, Gifu (JP); Yoshiaki Maeno, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 52 days.

(21) Appl. No.: 11/283,999

(22) Filed: Nov. 22, 2005

(65) Prior Publication Data
US 2006/0113462 A1    Jun. 1, 2006

(30) Foreign Application Priority Data
Dec. 1, 2004   (JP)   ............... 2004-348989

(51) Int. Cl.
*G01J 1/32* (2006.01)
*G02B 27/40* (2006.01)
*G02B 26/08* (2006.01)
*H01J 3/14* (2006.01)
*B41J 2/47* (2006.01)

(52) U.S. Cl. ............... 250/205; 250/201.4; 250/234; 359/205; 347/235

(58) Field of Classification Search .. 250/201.1–201.2, 250/201.4, 206, 206.1, 206.2, 205, 234; 359/205, 216; 347/235, 259
See application file for complete search history.

(56) References Cited

U.S. PATENT DOCUMENTS 5,877,494 A * 3/1999 Larsen et al. ............... 250/234

(Continued)

FOREIGN PATENT DOCUMENTS

JP    05-181086    7/1993

(Continued)

OTHER PUBLICATIONS

Japanese Office Action, with English Translation, issued in corresponding Japanese Patent Application No. 2004-348989, dated on Apr. 20, 2007.

(Continued)

*Primary Examiner*—Kevin Pyo
*Assistant Examiner*—Don Williams
(74) *Attorney, Agent, or Firm*—McDermott Will & Emery LLP

(57) ABSTRACT

In a beam irradiation device of the present invention, laser beams emitted from a semiconductor laser impinge on an irradiation lens supported by a lens actuator. The laser beams that have passed through the irradiation lens change in outgoing angle in the direction of a y-z plane as the lens actuator is driven. A laser beam scan in the target region is thus performed. A part of the laser beams that have passed through the irradiation lens is reflected and separated by a beam splitter. The separated beams are converged on a PSD through a converging lens. A DSP control circuit monitors a scan position of the laser beams that have passed through the irradiation lens based on a signal from the PSD. When an irradiation position has deviated from a scan trajectory, the DSP control circuit controls an actuator driving circuit to draw the irradiation position back onto the scan trajectory. This beam irradiation device can realize a smooth and stable beam scan operation with a simple construction.

10 Claims, 9 Drawing Sheets

U.S. PATENT DOCUMENTS 6,507,009 B1 * 1/2003 Ohnishi et al. .......... 250/201.2

FOREIGN PATENT DOCUMENTS

| JP | 5-181086 | 7/1993 |
| JP | 6-137867 | 5/1994 |
| JP | 06-137867 | 5/1994 |
| JP | 06-235633 | 8/1994 |
| JP | 6-235633 | 8/1994 |
| JP | 6-265628 | 9/1994 |
| JP | 06-265628 | 9/1994 |
| JP | 11-083988 | 3/1999 |
| JP | 11-160436 | 6/1999 |

OTHER PUBLICATIONS

Japanese Office Action, with English Translation, issued in corresponding Japanese Patent Application No. 2004-348989, dated on Jul. 6, 2007.

Japanese Office Action, with English translation, issued in Japanese Patent Application No. JP 2004-348989, mailed Oct. 16, 2007.

* cited by examiner

POSITION-VOLTAGE CHARACTERISTICS

STRUCTURE OF PSD

SPOT TRAJECTORY ON PSD

EXAMPLE OF SCAN TRAJECTORY

SCAN OPERATION

BEAM IRRADIATION DEVICE

BACKGROUND OF THE INVENTION

1. Field of the Invention

The present invention relates to a beam irradiation device suitably used for, for example, vehicle-to-vehicle distance detectors, distance detectors, and the like.

2. Description of the Related Art

In recent years, vehicle-to-vehicle distance detectors and distance detectors using laser beams have been employed in various fields. A vehicle-to-vehicle distance detector detects the presence or absence of an obstacle and measures a distance to the obstacle by detecting reflected beams that are obtained when laser beams are radiated from a front portion of a vehicle. In this case, the laser beams are caused to longitudinally and laterally scan a target region preset in a front space. A time difference between a timing for radiating the laser beams and a timing for receiving the reflected beams is measured at each scan position, and a distance to an obstacle located in front of each scan position is calculated from a result of the measurement.

For those detectors, a so-called beam irradiation device for irradiating a target region with laser beams while performing a scan longitudinally and laterally is employed. A laser beam scan is performed by means of a scan mechanism employing a polygon mirror, a scan mechanism employing a lens actuator, or the like.

In the scan mechanism employing the polygon mirror, laser beams are radiated onto lateral faces of the polygon mirror while rotating the polygon mirror. The polygon mirror has a polygonal cross-section and mirrors are formed on the respective lateral faces thereof. By irradiating the lateral faces of the polygon mirror with laser beams while rotating the polygon mirror, the angles of incidence of the laser beams for the respective lateral faces are changed. Thus, reflected beams are scanned in the direction in which the polygon mirror is rotated.

In this scan mechanism, however, it is difficult to perform a beam scan in a direction parallel to a rotation axis of the mirror. A scan in this direction requires, for example, an additional mechanism for changing the inclination of the rotation axis of the mirror. Alternatively, the inclination angles of the respective lateral faces with respect to the rotation axis of the mirror need to be changed in advance. In this scan mechanism, furthermore, the flatness accuracy of mirror faces and the rotational state of the mirror greatly affect a beam scan state. Thus, realization of a high-accuracy scan operation requires a high-accuracy flattening work technology and also requires the use of a high-performance motor.

On the other hand, a scan mechanism employing a lens actuator is disclosed in, for example, JP 11-83988 A. In this scan mechanism, since a beam scan is performed by driving a lens, a two-dimensional scan operation can be realized with a relatively simple construction. Also, this scan mechanism does not require the use of a high-accuracy flattening work technology, a high-performance motor, or the like and thus can achieve a cost reduction in comparison with cases where a polygon mirror is used.

In this scan mechanism, however, the lens tends to be displaced undesirably due to vibrations, disturbances, or the like. As a result, there arises a problem in that the scan trajectory of laser beams deviates from a desired scan trajectory. With this scan mechanism, therefore, it may be impossible to scan a target region entirely. In this case, an inconvenience such as a failure to detect an obstacle is caused. A failure to detect an obstacle may lead to an accident when the beam irradiation device is used for a vehicle-to-vehicle distance detector or the like. Therefore, a stable scan operation must be realized in the beam irradiation device especially when the beam irradiation device is used for a vehicle-to-vehicle distance detector or the like.

SUMMARY OF THE INVENTION

It is an object of the present invention to provide a beam irradiation device capable of realizing a smooth and stable scan operation with a simple construction.

According to one aspect of the present invention, a beam irradiation device includes: a beam source for emitting laser beams; a lens for radiating the laser beams emitted from the beam source toward a target region; displacement means for displacing the lens at least in a direction perpendicular to an optical axis of the laser beams; scan means for driving the displacement means to cause the laser beams to perform a scan within the target region; separation means for separating a part of the laser beams that have passed through the lens; detection means for receiving the laser beams separated by the separation means and detecting a beam receiving position of the separated beams on a beam receiving face; and correction means for correcting a scan position of the laser beams radiated toward the target region based on the beam receiving position detected by the detection means.

According to the present invention, since the irradiation position of laser beams in the target region and the beam receiving position of separated beams on the beam receiving face correspond to each other on one-to-one basis, the irradiation position of the laser beams can be monitored referring to the beam receiving position of the separated beams. Thus, the scan trajectory of the laser beams can be made to follow the desired scan trajectory by correcting the scan position of the laser beams radiated onto the target region based on the beam receiving position detected by the detection means.

The beam irradiation device according to this aspect of the present invention further includes: power adjusting means for setting an outgoing power of the laser beams during a period of the scan to a first level and for changing the outgoing power of the laser beams to a level different from the first level when the beam receiving position detected by the detection means has reached a position corresponding to a specific position within the target region.

With this construction, since laser beams continue to be emitted during the scan, the scan trajectory of the laser beams can be made to sequentially follow the desired scan trajectory. Further, the specific position and a scan position other than the specific position can be smoothly distinguished from each other by changing the level of the outgoing power at the specific position. It should be noted that "the specific position" is set within the target region so as to detect an obstacle, a distance, and the like.

In this case, a beam irradiation device may have such a construction that the power adjusting means increases the level of the outgoing power of the laser beams in a pulse-like manner when the beam receiving position detected by the detection means has reached the position corresponding to the specific position within the target region.

With this construction, wasteful radiation of laser beams can be suppressed. As a result, for example, a reduction in power consumption, prolongation of the life of a laser beam source, and the like can be achieved.

Further, a beam irradiation device may have such a construction that the correction means holds as a reference moving locus a moving locus of the beam receiving position of the separated beams appearing on the beam receiving face at a time when the laser beams are caused to perform a scan along a desired scan trajectory, compares the reference moving locus with the beam receiving position of the separated beams actually detected by the detection means, and corrects the scan position of the laser beams such that the detected beam receiving position approaches the reference moving locus.

With this construction, the scan trajectory of laser beams can be made to smoothly follow the desired scan trajectory.

In this case, a beam irradiation device may have such a construction that the correction means corrects the scan position of laser beams radiated toward the target region such that a beam receiving position of the separated beams actually detected by the detection means at a scan timing Tn approaches a beam receiving position on the reference moving locus at the scan timing Tn.

With this construction, the scan position of laser beams can be smoothly drawn back to the desired scan position, so an accurate scan operation can be realized.

Additionally, a beam irradiation device may have such a construction that the correction means corrects the scan position of laser beams radiated toward the target region such that a beam receiving position of the separated beams actually detected by the detection means at a scan timing Tn approaches a beam receiving position on the reference moving locus at a scan timing Tn+ΔT advanced from the scan timing Tn by a period ΔT.

With this construction, the scan position of laser beams can be smoothly drawn to a subsequently scheduled scan position, so an efficient scan operation can be realized.

As described above, the present invention can provide a beam irradiation device capable of realizing a smooth and stable scan operation with a simple construction.

BRIEF DESCRIPTION OF THE DRAWINGS

The foregoing and other objects and novel features of the present invention will become more apparent by reading the description of the following embodiments in conjunction with the accompanying drawings in which.

DETAILED DESCRIPTION OF THE PREFERRED EMBODIMENTS

Embodiments of the present invention will be described hereinafter with reference to the drawings.

Figure 1:
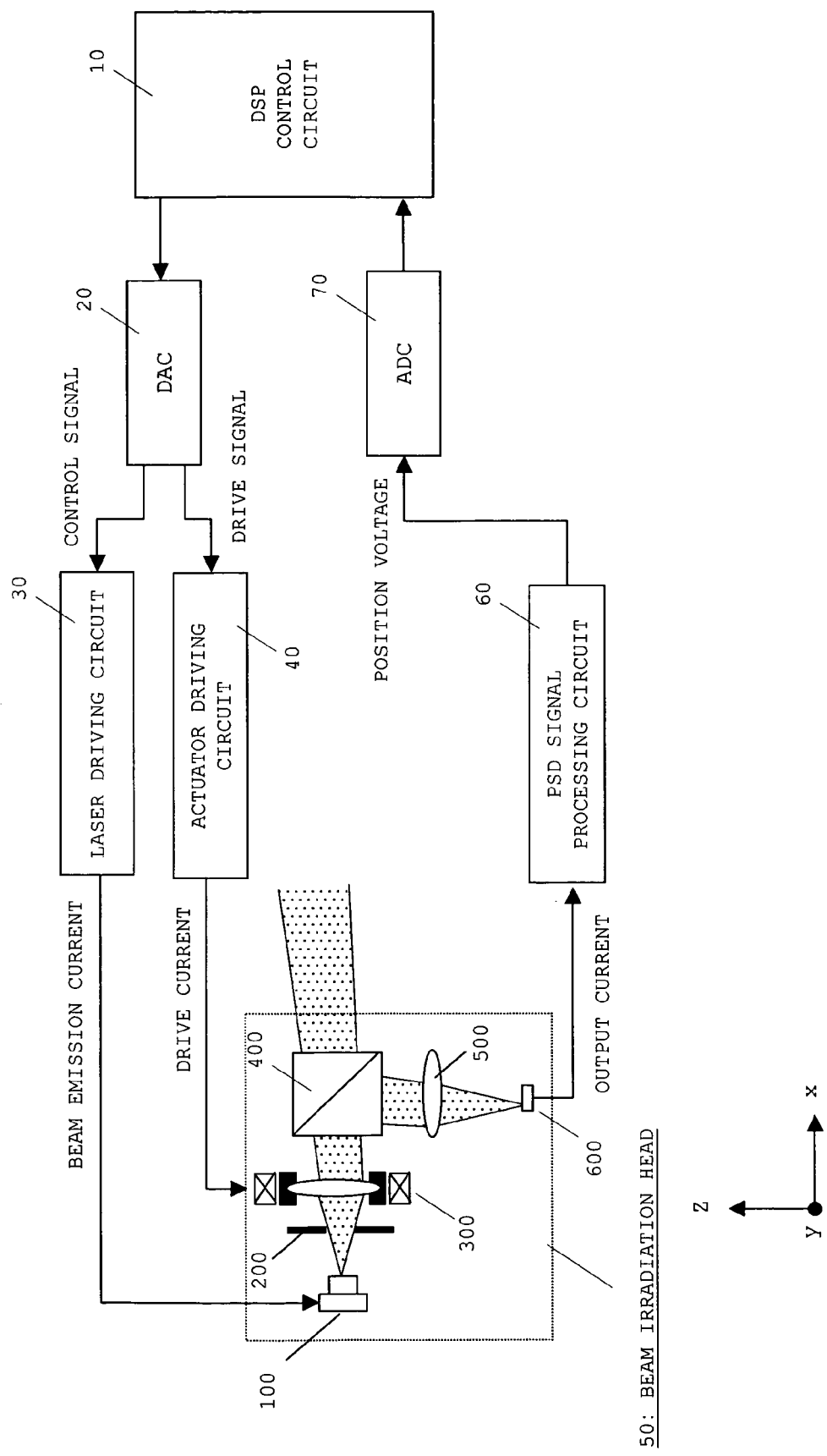
FIG. 1 shows a construction of a beam irradiation device according to an embodiment of the present invention.

FIG. 1 shows the configuration of a beam irradiation device according to an embodiment of the present invention. As shown in FIG. 1, a beam irradiation device is provided with a digital signal processor (DSP) control circuit 10, a digital analog converter (DAC) 20, a laser driving circuit 30, an actuator driving circuit 40, a beam irradiation head 50, a position sensitive detector (PSD) signal processing circuit 60, and an analog digital converter (ADC) 70.

The DSP control circuit 10 outputs a digital signal for performing drive control of the laser driving circuit 30 and the actuator driving circuit 40 to the DAC 20. The DAC 20 converts the digital signal inputted from the DSP control circuit 10 into analog signals (control signals) and outputs the converted analog signals to the laser driving circuit 30 and the actuator driving circuit 40, respectively. The laser driving circuit 30 drives a semiconductor laser 100 in the beam irradiation head 50 in accordance with the control signal inputted from the DAC 20. The actuator driving circuit 40 drives a lens actuator 300 in the beam irradiation head 50 in accordance with the control signal inputted from the DAC 20.

The beam irradiation head 50 irradiates laser beams with a target region set in a space in front of the beam irradiation device while performing a scan. As shown in FIG. 1, the beam irradiation head 50 is provided with the semiconductor laser 100, an aperture 200, the lens actuator 300, a beam splitter 400, a converging lens 500, and a PSD 600.

Laser beams emitted from the semiconductor laser 100 are shaped into a desired shape by the aperture 200 and then allowed to impinge on an irradiation lens supported by the lens actuator 300. The irradiation lens is supported by the lens actuator 300 so as to be displaceable in the direction of a y-z plane of FIG. 1. Therefore, the laser beams that have passed through the irradiation lens change in outgoing angle in the direction of the y-z plane as the lens actuator 300 is driven. Thus, a laser beam scan on the target region is performed.

A part of the laser beams that have passed through the irradiation lens is reflected by the beam splitter 400 and separated from radiated laser beams (laser beams radiated onto the target region). The separated laser beams (separated beams) are converged onto the PSD 600 through the converging lens 500. The PSD 600 has a beam receiving face parallel to an x-y plane of FIG. 1 and outputs a current corresponding to a convergence position of the separated beams on the beam receiving face. The convergence position of the separated beams on the beam receiving face and the irradiation position of the radiated laser beams on the target region correspond to each other on one-to-one basis. Therefore, the current outputted from the PSD 600 corresponds to the irradiation position of the radiated laser beams on the target region. The construction and current outputting operation of the PSD 600 will be described later in detail with reference to FIGS. 4, 5A, and 5B.

An output current from the PSD 600 is inputted to the PSD signal processing circuit 60. Based on the inputted current, the PSD signal processing circuit 60 outputs a voltage signal indicating a convergence position of the separated beams to the ADC 70. The ADC 70 converts the inputted voltage signal into a digital signal and outputs the converted signal to the DSP control circuit 10. Based on the inputted voltage signal, the DSP control circuit 10 detects a convergence position of the separated beams on the beam receiving face.

Disposed in the DSP control circuit 10 are a table (scan table) for scanning the irradiation position of laser beams within the target region and a table (trajectory table) indicating a trajectory of the convergence position of separated beams on the beam receiving face when the laser beams are scanned according to the scan table.

In performing a laser beam scan operation, the DSP control circuit 10 outputs a signal for controlling the actuator driving circuit 40 to the DAC 20 while referring to the scan table. At the same time, the DSP control circuit 10 detects a convergence position of separated beams on the beam receiving face based on a signal inputted from the ADC 70, compares the detected position with a desired convergence position prescribed in the trajectory table, and outputs a signal for controlling the actuator driving circuit 40 to the DAC 20 such that the detected position is drawn to the desired convergence position. Due to this servo operation, the radiated laser beams perform a scan within the target region in such a manner as to follow the trajectory prescribed in the scan table. The servo operation will be described later in detail with reference to FIG. 7.

Furthermore, in performing the laser beam scan operation, the DSP control circuit 10 outputs a signal for setting an outgoing power of the semiconductor laser 100 to a low level Pwa to the laser driving circuit 30 via the DAC 20. At the same time, the DSP control circuit 10 monitors a convergence position of separated beams on the beam receiving face, and outputs a signal for setting the outgoing power of the semiconductor laser 100 to a high level Pwb in a pulse-like manner for a certain period to the laser driving circuit 30 via the DAC 20 at a timing when the convergence position reaches a position preset as a position (luminescent point) for detecting an obstacle, a distance, or the like. The power Pwa is set at least to such a value that a current allowing detection of a position of separated beams on the beam receiving face is outputted from the PSD 600. The power Pwb is set to a value sufficient for desired detection of an obstacle, distance, or the like. Thus, the radiated laser beams become luminescent with high power at the timing of arrival at the luminescence point while performing a scan within the target region with low power.

Figure 2:
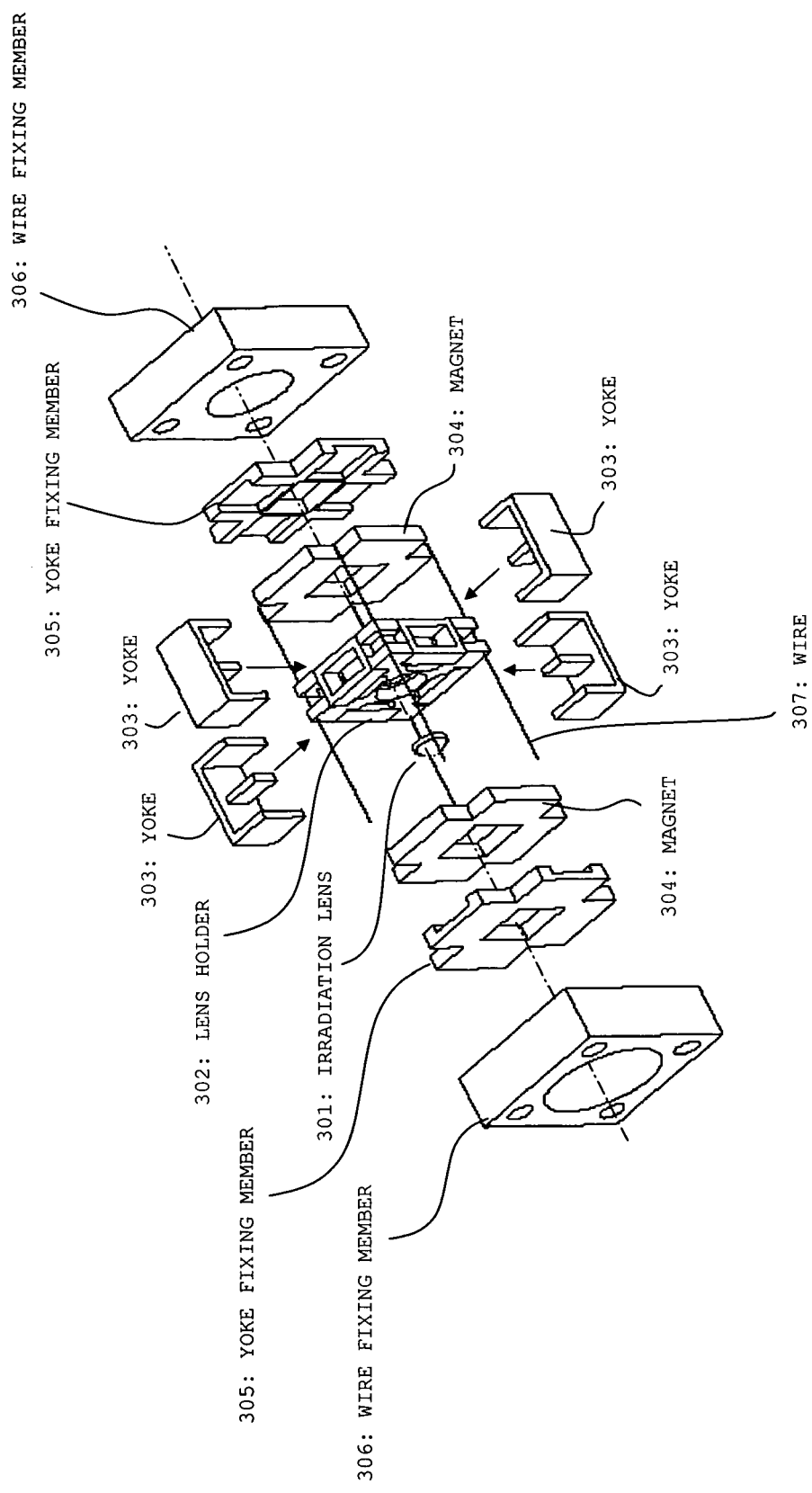
FIG. 2 shows the construction of the beam irradiation device according to the embodiment.

FIG. 2 shows the construction of the lens actuator 300 (an exploded perspective view).

Referring to FIG. 2, an irradiation lens 301 is fitted in a central opening of a lens holder 302. Coils are fitted on four lateral faces of the lens holder 302, respectively. Central protruding portions of yokes 303 are inserted into the coils respectively as indicated by arrows shown in FIG. 2. Tongue strips of each of the yokes 303 on both sides are fittingly inserted into corresponding depressed portions of a pair of yoke fixing members 305. In addition, magnets 304 are secured to the yoke fixing members 305 respectively such that the tongue strips of the yokes 303 are sandwiched therebetween. In this state, the yoke fixing members 305 accompanied with the magnets 304 are mounted on a base (not shown).

Moreover, a pair of wire fixing members 306 are mounted on the base. The lens holder 302 is resiliently supported by the wire fixing member 306 via wires 307. Holes for fittingly inserting the wires 307 therethrough are formed through the lens holder 302 at its four corners. After the wires 307 have been fittingly inserted through the holes, respectively, both ends of each of the wires 307 are secured to the wire fixing members 306, respectively. Thus, the lens holder 302 is resiliently supported by the wire fixing members 306 via the wires 307.

At the time of driving, drive signals are supplied from the actuator driving circuit 40 to the respective coils fitted to the lens holder 302. Thus, an electromagnetic driving force is generated, so the irradiation lens 301 is two-dimensionally driven together with the lens holder 302.

Figure 3:
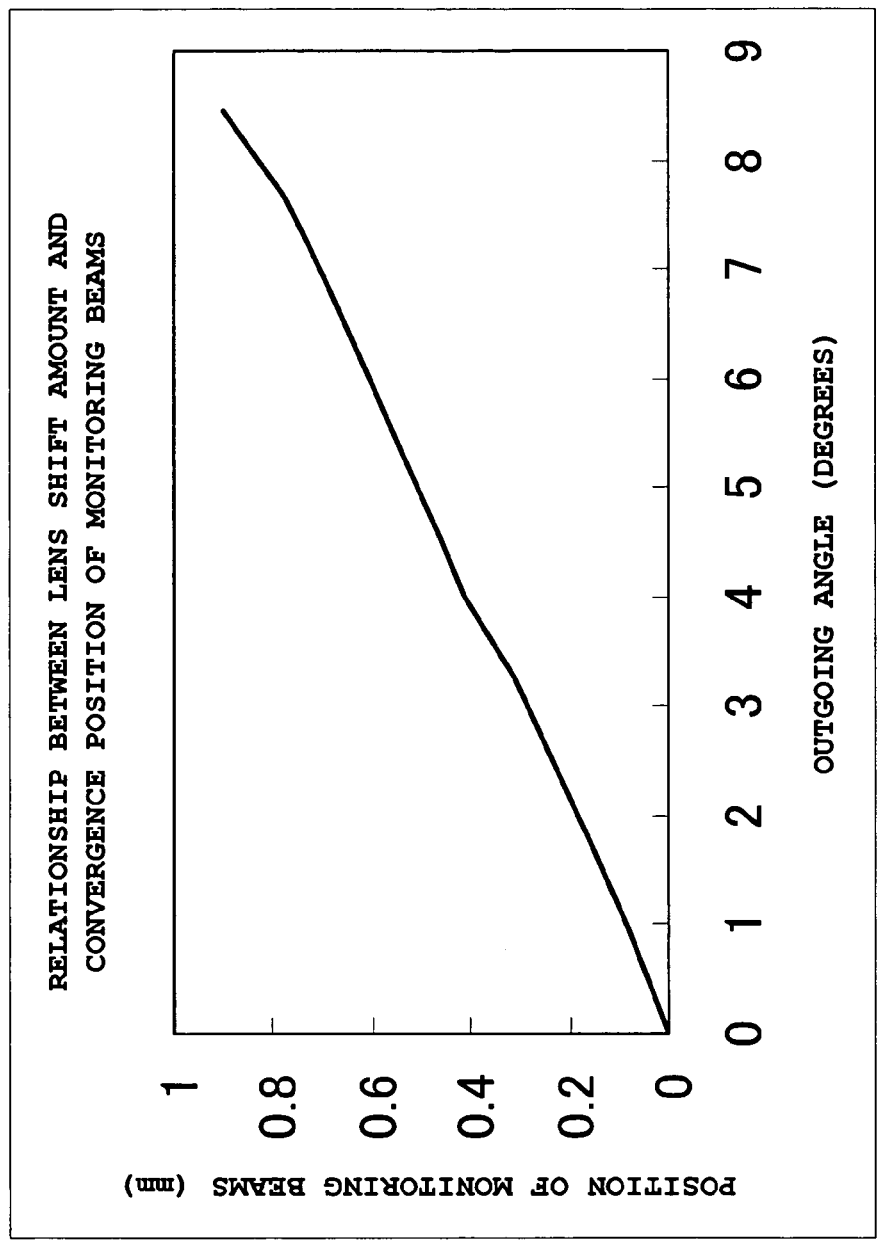
FIG. 3 is an illustrative view of a relationship between an outgoing angle of radiated laser beams and a convergence position of separated beams according to the embodiment.

FIG. 3 shows a relationship (simulation) between an outgoing angle of radiated laser beams and a convergence position of separated beams (referred to as monitoring beams of FIG. 3) on the beam receiving face of the PSD 600 at the time when the lens actuator 300 is driven to displace the irradiation lens 301 in one direction. As shown in FIG. 3, the displacement amount of the separated beams increases in proportion to the outgoing angle of the radiated laser beams. The characteristic shown in FIG. 3 is undulated because aberration is caused in the separated beams on the beam receiving face of the PSD 600 by two-dimensionally driving the irradiation lens 301.

Figure 4:
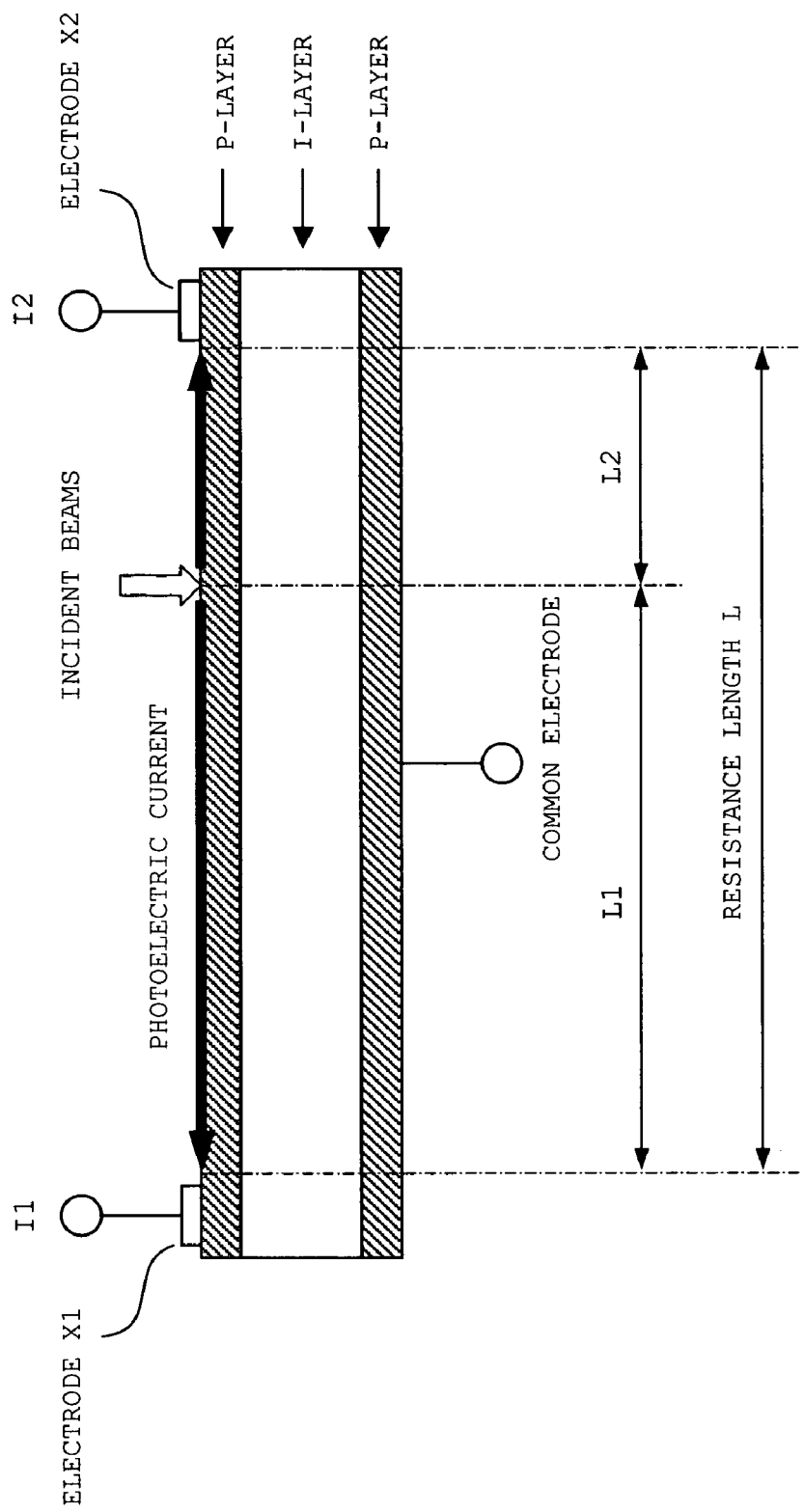
FIG. 4 shows a construction of a PSD according to the embodiment.

FIG. 4 shows the structure of the PSD 600. Referring to FIG. 4, the structure of the PSD 600 is illustrated when viewed in a y-axis direction of FIG. 1.

As shown in FIG. 4, the PSD 600 is structured such that a P-type resistance layer serving as both a beam receiving face and a resistance layer is formed on the surface of an N-type high-resistance silicon substrate. Electrodes X1 and X2 for outputting a photoelectric current in an x-axis direction of FIG. 1 and electrodes Y1 and Y2 (not shown in FIG. 4) for outputting a photoelectric current in the y-axis direction of FIG. 1 are formed on the surface of the resistance layer. A common electrode is formed on a reverse face side of the resistance layer.

When separated beams are converged on the beam receiving face, an electric charge proportional to the amount of beams is generated on a convergence position. This electric charge reaches the resistance layer as a photoelectric current, which is divided into currents inversely proportional to the distances to the respective electrodes X1, X2, Y1, and Y2. Those currents are then outputted therefrom, respectively. The currents outputted from the electrodes X1, X2, Y1, and Y2 have magnitudes that are determined inversely proportional to the distances from the convergence position of the separated beams to the respective electrodes X1, X2, Y1, and Y2. Thus, the convergence position on the beam receiving face can be detected based on values of the currents outputted from the electrodes X1, X2, Y1, and Y2.

Figure 5B:
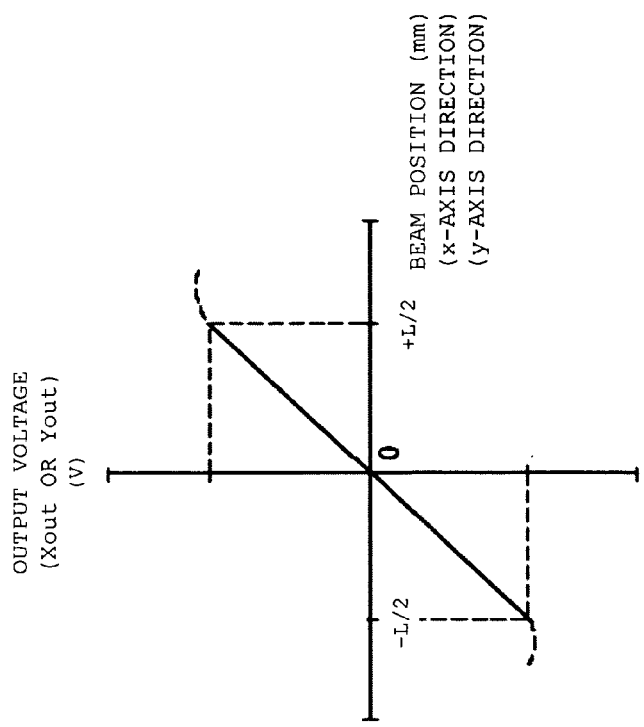
FIG. 5A is an illustrative view of the structure of the PSD and FIG. 5B is an illustrative view of fluctuations in position detecting voltage according to the embodiment.
Figure 5A:
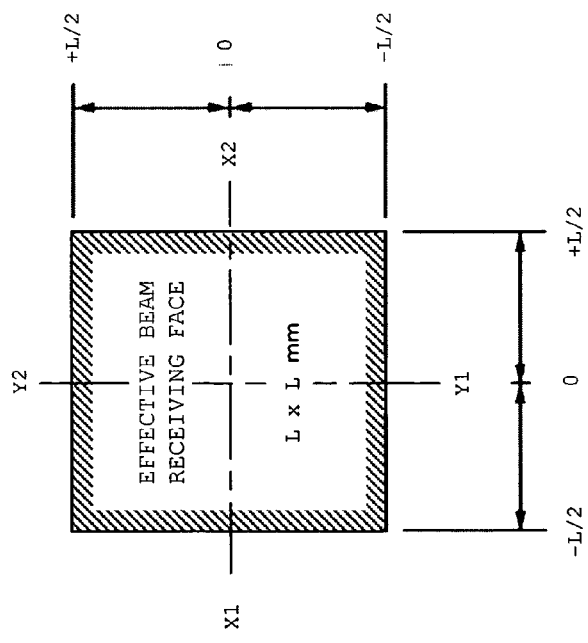

FIG. 5A is a view showing an effective beam receiving face of the PSD 600. FIG. 5B is a view showing a relationship between position detecting voltages generated in the PSD signal processing circuit 60 based on the currents outputted from the electrodes X1, X2, Y1, and Y2 and the convergence position of the separated beams on the effective beam receiving face. Referring to FIG. 5A, the effective beam receiving face is square. Given that a center position of the effective beam receiving face is a reference position (0 position), FIG. 5B shows a relationship between displacement amounts of the convergence position in the x-axis direction and the y-axis direction with respect to the reference position and an output voltage.

Based on the currents outputted from the electrodes X1, X2, Y1, and Y2, the PSD signal processing circuit 60 generates a voltage Xout corresponding to a displacement amount of the convergence position in the x-axis direction and a voltage Yout corresponding to a displacement amount of the convergence position in the y-axis direction, and outputs the voltage Xout and voltage Yout to the DSP control circuit 10 via the ADC 70. The DSP control circuit 10 detects the displacement amounts of the convergence position in the x-axis direction and the y-axis direction from the inputted voltages Xout and Yout, respectively.

A scan operation in this embodiment will be described with reference to FIGS. 6A, 6B, and 6C.

Figure 6C:
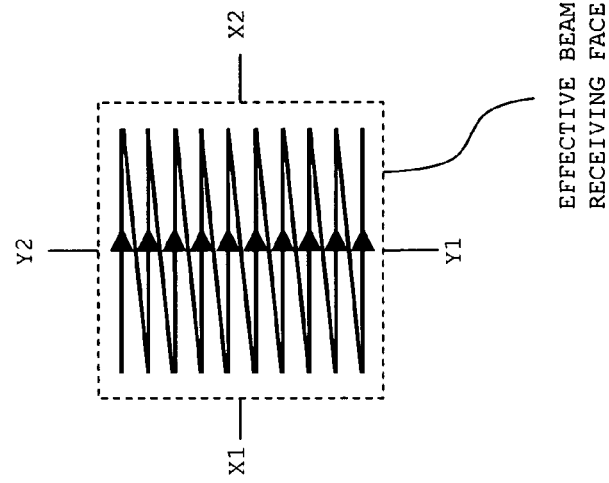
FIGS. 6A, 6B, and 6C are illustrative views of a scan operation according to the embodiment.
Figure 6B:
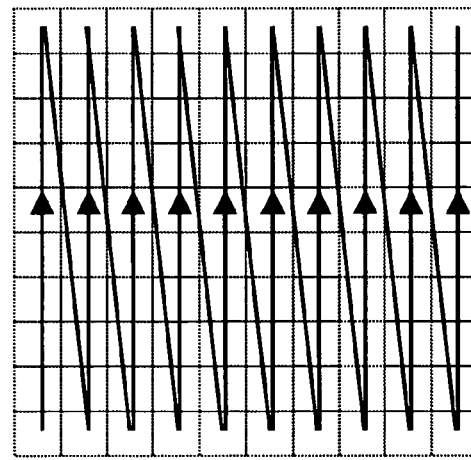
Figure 6A:
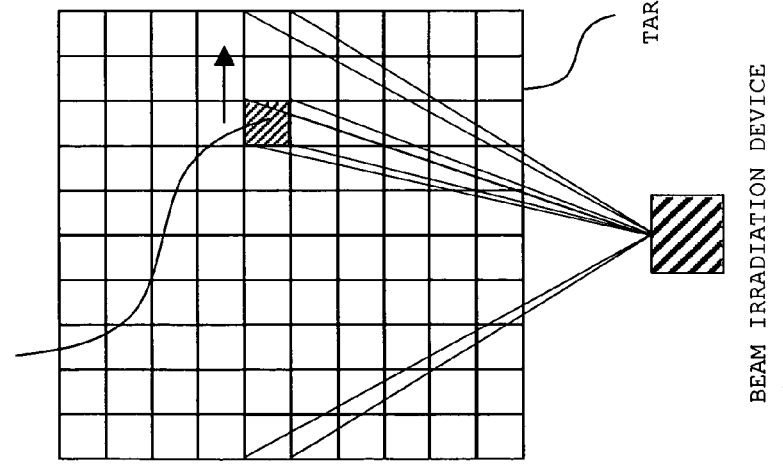

As shown in FIG. 6A, radiated laser beams are scanned so as to sequentially irradiate all matrices into which the target region set in the space in front of the beam irradiation device is divided. The sequence in which the matrices are scanned can be set arbitrarily. For example, as shown in FIG. 6B, a setting can also be made such that the matrices are sequentially scanned line by line starting from the one at the upper-left corner position. As described above, a scan trajectory (scan sequence) is prescribed in the scan table of the DSP control circuit 10.

The convergence position of separated beams on the beam receiving face of the PSD 600 moves along a trajectory shown in FIG. 6C when a scan is performed as shown in FIG. 6B. The trajectory of FIG. 6C corresponds to the scan trajectory of FIG. 6B on one-to-one basis. Accordingly, the scan position of radiated laser beams can be identified from the convergence position on the trajectory of FIG. 6C. In this case, as described above, the trajectory of FIG. 6C complies with the trajectory table in the DSP control circuit 10.

In the beam irradiation device, it is most ideal that radiated laser beams are scanned along the scan trajectory shown in FIG. 6B. However, since the beam irradiation device usually undergoes undesired vibrations, disturbances, and the like, the scan position of the radiated laser beams deviates from a desired scan trajectory. In this case, the convergence position of the separated beams on the beam receiving face also deviates from the trajectory shown in FIG. 6C in accordance with the deviation of the scan position.

Figure 7:
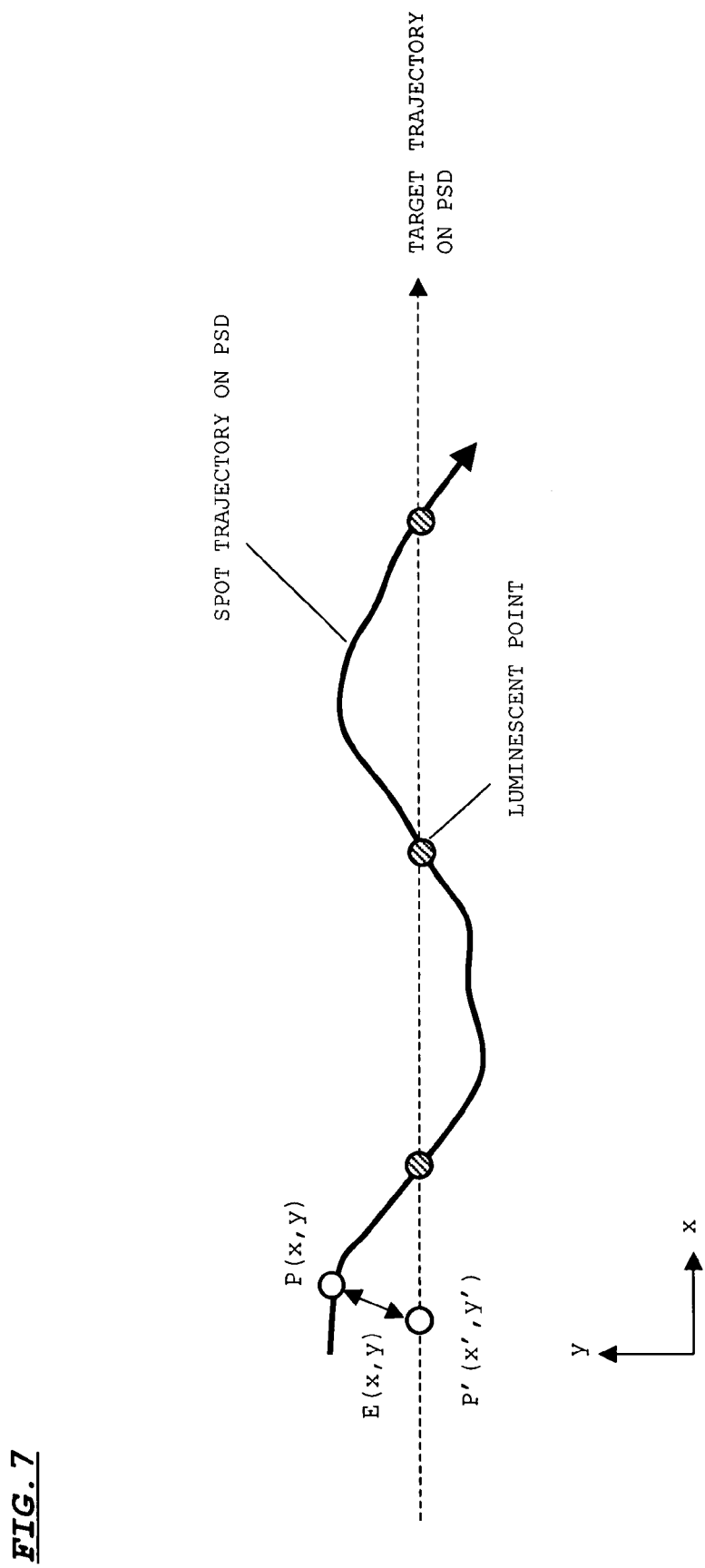
FIG. 7 is an illustrative view of a method of applying trajectory servo according to the embodiment.

FIG. 7 shows an example of a spot trajectory of separated beams on the effective beam receiving face. In this case, as described above, the DSP control circuit 10 supplies a servo signal to the actuator driving circuit 40 so that the convergence position of the separated beams is drawn to the target trajectory.

It is now assumed that the convergence position of separated beams is P(x, y) and that the convergence position to be located on the target trajectory is P' (x', y') at this moment. The convergence position P' (x', y') on the target trajectory is acquired from the trajectory table set in the DSP control circuit 10. More specifically, the convergence position corresponding to the scan position of radiated laser beams is acquired from the trajectory table.

In this case, the DSP control circuit 10 calculates Ex=x−x' and Ey=y−y' based on P(x, y) and P' (x', y') and supplies a servo signal to the actuator driving circuit 40 based on a calculation result such that both Ex and Ey become equal to 0. Thus, the scan position of radiated laser beams is drawn back toward a scan position to be located on the scan trajectory at this moment. In response to this, the convergence position of separated beams is also drawn toward the convergence position P' (x', y') to be located on the target trajectory at this timing. Due to this servo operation, the radiated laser beams are scanned so as to follow the desired scan trajectory.

While the scan operation is performed with application of servo, the DSP control circuit 10 monitors, as described above, whether or not the convergence position of separated beams has reached the position preset as the position (luminescent point) for detecting an obstacle, a distance, or the like. The outgoing power of the semiconductor laser 100 is then set to the high level Pwb in a pulse-like manner for a certain period at a timing when the convergence position has reached the luminescent point.

It is determined whether or not the convergence position has reached the luminescent point, depending on whether or not the distance between the convergence position and the luminescent point has become smaller than a preset distance. Thus, beams can be emitted with high power in the neighborhood of a desired convergence position even when the convergence position has somewhat deviated from the target trajectory.

Figure 8:
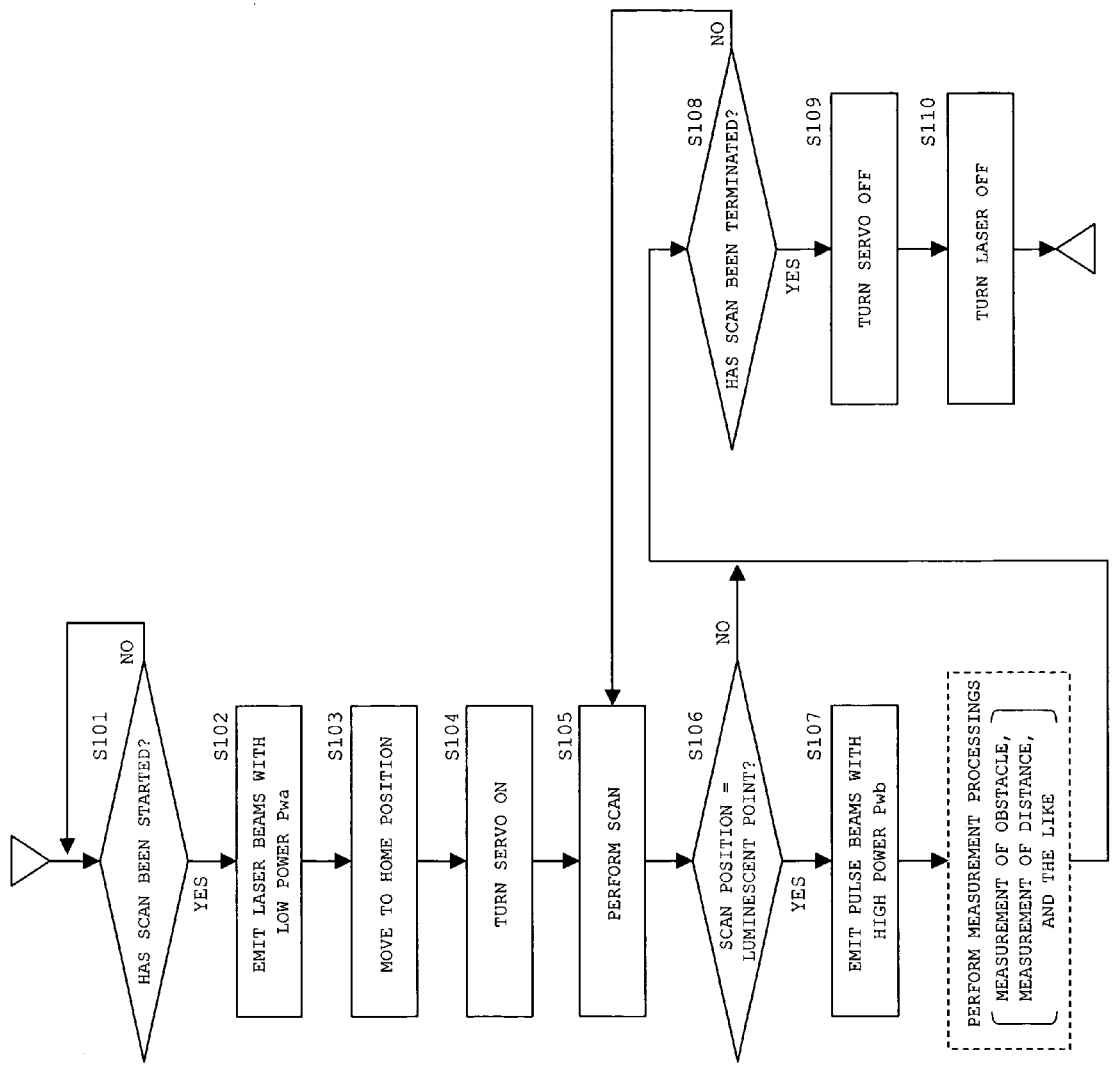
FIG. 8 is a flowchart showing the scan operation according to the embodiment.

FIG. 8 shows a flowchart used in performing the scan operation.

When the scan operation is started in S101, laser beams are emitted from the semiconductor laser 100 with low power (Pwa) in S102. After that, the irradiation position of radiated laser beams is shifted to a home position in S103. The home position is set to, for example, a position of a leftmost, vertically substantially central one of the matrices shown in FIG. 6B. Furthermore, after a trajectory servo for the radiated laser beams has been turned ON in S104, the scan is performed in S105.

Then, it is determined in S106 whether or not the scan position has reached the luminescent point. When the scan position has not reached the luminescent point, it is determined in S108 whether or not the scan operation has been terminated. After that, a processing returns to S105 to continue to perform the scan operation with the trajectory servo ON. On the other hand, when the scan position has reached the luminescent point, the outgoing laser power of the semiconductor laser 100 is set to the high power Pwb in a pulse-like manner for a certain period in S107, so the target region is irradiated with high-power radiated laser beams. At this moment, a detector mounted with the beam irradiation device performs processings of measuring an obstacle, measuring a distance, etc. by receiving beams reflected from the target region.

After that, it is determined in S108 whether or not the scan operation has been terminated. When the scan operation has not been terminated, a processing returns to S105 to repeat the aforementioned scan operation (with the low power Pwa). On the other hand, when the scan operation has been terminated, the trajectory servo is turned OFF in S109 and then the semiconductor laser 100 is turned OFF in S110. The above-mentioned control of drawing the scan position shown in FIG. 7 is performed during the scan operation.

As described above, the present invention makes it possible to smoothly draw the scan position of radiated laser beams back to the desired scan trajectory even when the scan position has deviated therefrom. Accordingly, a stable scan operation can be realized even when the beam irradiation device undergoes undesired vibrations or disturbances.

It goes without saying that the present invention is not limited to the aforementioned embodiment but may be subject to a variety of other modifications.

Figure 9:
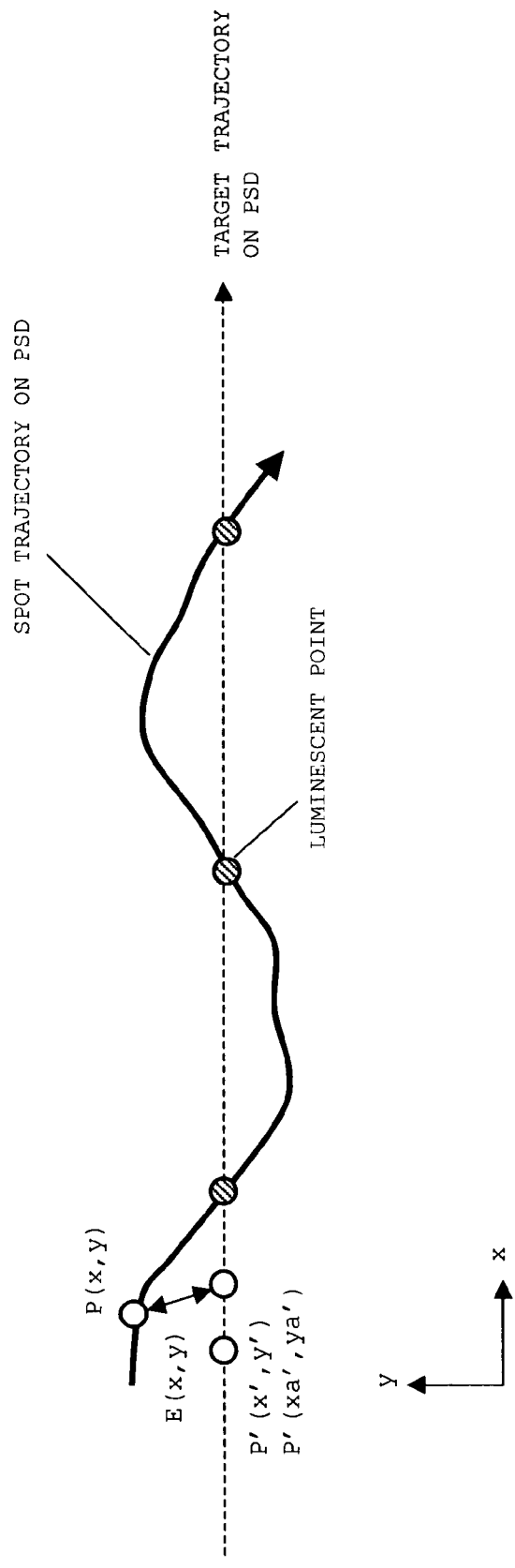
FIG. 9 is an illustrative view of a method of applying trajectory servo according to another embodiment of the present invention.

For instance, although servo is applied such that the convergence position P(x, y) of separated beams is drawn toward the convergence position P' (x', y') to be located on the target trajectory at the above-mentioned timing in the aforementioned embodiment as described with reference to FIG. 7, the convergence position of separated beams can also be drawn onto the target trajectory through other servo processings. For example, as shown in FIG. 9, the convergence position of separated beams can also be drawn toward a convergence position P' (xa', ya') to be located on the target trajectory after the lapse of ΔT from the above-mentioned timing. In this case, the DSP control circuit 10 calculates Ex=x−xa' and Ey=y−ya' based on P(x, y) and P' (xa', ya') and supplies a servo signal to the actuator driving circuit 40 based on a result of the calculation such that both Ex and Ey become equal to 0. In this manner, the scan position of radiated laser beams can be smoothly drawn toward a subsequently scheduled scan position. As a result, an efficient scan operation can be realized.

In the foregoing description, the scan position of radiated laser beams may sharply deviate from a desired scan position as a result of servo deviation when the beam irradiation device undergoes vibrations or disturbances of an inconceivable magnitude. In such cases, for example, in the scan mode shown in FIG. 6B, it is appropriate to return the scan position to the head position of a line that is being scanned at the time of the occurrence of servo deviation and to continue to perform the succeeding scan processings from that position. In this case, those luminescent points on the line which have already finished the operation of emitting optical power laser beams through a scan before servo deviation may not emit high-power beams again.

If a so-called disturbance observer for predicting vibrations and disturbances is employed as well, the trajectory of radiated laser beams can be followed more smoothly. In this case, the occurrence of servo deviation can be effectively suppressed even when the beam irradiation device undergoes vibrations or disturbances of an inconceivable magnitude.

Further, although the irradiation lens 301 is displaced on a y-z plane of FIG. 2 in the aforementioned embodiments, a beam scan may also be performed by tilting it in a direction perpendicular to the x-axis direction.

Still further, although the beam splitter 400 is used to guide some of radiated laser beams to the PSD 600 in the aforementioned embodiments, a glass plate with no anti-reflection coating thereon can be used instead of the beam splitter 400 so as to guide some of radiated laser beams to the PSD 600. In this case, the glass plate guides about 5% of radiated laser beams to the PSD 600. Even with a luminous intensity of this level, the PSD 600 can usually output a signal sufficient to detect a position.

In addition, the embodiments of the present invention can be appropriately modified in various manners within the scope of technical concepts defined by claims.

What is claimed is:

1. A beam irradiation device, comprising:
   a beam source for emitting laser beams;
   a lens for radiating the laser beams emitted from the beam source toward a target region;
   displacement means for displacing the lens at least in a direction perpendicular to an optical axis of the laser beams;
   scan means for driving the displacement means to cause the laser beams to perform a scan within the target region;
   separation means for separating a part of the laser beams that have passed through the lens;
   detection means for receiving the laser beams separated by the separation means and detecting a beam receiving position of the separated beams on a beam receiving face;
   correction means for correcting a scan position of the laser beams radiated toward the target region based on the beam receiving position detected by the detection means; and
   power adjusting means for setting an outgoing power of the laser beams during a period of the scan to a first level and changing the outgoing power of the laser beams to a level different from the first level when the beam receiving position detected by the detection means has reached a position corresponding to a specific position within the target region.

2. A beam irradiation device according to claim 1, wherein:
   the power adjusting means increases the level of the outgoing power of the laser beams in a pulse-like manner when the beam receiving position detected by the detection means has reached the position corresponding to the specific position within the target region.

3. A beam irradiation device according to claims 1, or 2, wherein:
   the correction means holds as a reference moving locus a moving locus of the beam receiving position of the separated beams appearing on the beam receiving face at a time when the laser beams are caused to perform a scan along a desired scan trajectory, compares the reference moving locus with the beam receiving position of the separated beams actually detected by the detection means, and corrects the scan position of the laser beams such that the detected beam receiving position approaches the reference moving locus.

4. A beam irradiation device according to claim 3, wherein:
   the correction means corrects the scan position of laser beams radiated toward the target region such that a beam receiving position of the separated beams actually detected by the detection means at a scan timing Tn approaches a beam receiving position on the reference moving locus at the scan timing Tn.

5. A beam irradiation device according to claim 3, wherein: the correction means corrects the scan position of laser beams radiated toward the target region such that a beam receiving position of the separated beams actually detected by the detection means at a scan timing Tn approaches a beam receiving position on the reference moving locus at a scan timing Tn+ΔT advanced from the scan timing Tn a period ΔT.

6. A beam irradiation device, comprising:
   a beam source for emitting laser beams;
   a lens for radiating the laser beams emitted from the beam source toward a target region;
   a lens actuator for displacing the lens at least in a direction perpendicular to an optical axis of the laser beams;
   a scan control circuit for driving the lens actuator to cause the laser beams to perform a scan within the target region;
   a spectral element for separating a part of the laser beams that have passed through the lens;
   a detector for receiving the laser beams separated by the spectral element and detecting a beam receiving position of the separated beams on a beam receiving face;
   a correction control circuit for correcting a scan position of the laser beams radiated toward the target region based on the beam receiving position detected by the detector; and
   a power adjusting circuit for setting an outgoing power of the laser beams during a period of the scan to a first level and changing the outgoing power of the laser beams to a level different from the first level when the beam receiving position detected by the detection means has reached a position corresponding to a specific position within the target region.

7. A beam irradiation device according to claim 6, wherein:
the power adjusting circuit increases the level of the outgoing power of the laser beams in a pulse-like manner when the beam receiving position detected by the detector has reached the position corresponding to the specific position within the target region.

8. A beam irradiation device according to claim 6, or 7, wherein:
the correction control circuit holds as a reference moving locus a moving locus of the beam receiving position of the separated beams appearing on the beam receiving face at a time when the laser beams are caused to perform a scan along a desired scan trajectory, compares the reference moving locus with the beam receiving position of the separated beams actually detected by the detection means, and corrects the scan position of the laser beams such that the detected beam receiving position approaches the reference moving locus.

9. A beam irradiation device according to claim 8, wherein:
the correction control circuit corrects a scan position of laser beams radiated toward the target region such that a beam receiving position of the separated beams actually detected by the detector at a scan timing Tn approaches a beam receiving position on the reference moving locus at the scan timing Tn.

10. A beam irradiation device according to claim 8, wherein:
the correction control circuit corrects the scan position of laser beams radiated toward the target region such that a beam receiving position of the separated beams actually detected by the detector at a scan timing Tn approaches a beam receiving position on the reference moving locus at a scan timing Tn+$\Delta$T advanced from the first scan timing by a period $\Delta$T.

* * * * *